(12) United States Patent
Fujiki et al.

(10) Patent No.: US 11,048,969 B2
(45) Date of Patent: Jun. 29, 2021

(54) IDENTIFICATION DEVICE, IDENTIFICATION METHOD, IDENTIFICATION SYSTEM, AND DATABASE

(71) Applicant: BIOME INC., Kyoto (JP)

(72) Inventors: Shogoro Fujiki, Kyoto (JP); Takanori Genroku, Kyoto (JP)

(73) Assignee: BIOME INC., Kyoto (JP)

( * ) Notice: Subject to any disclaimer, the term of this patent is extended or adjusted under 35 U.S.C. 154(b) by 0 days.

(21) Appl. No.: 16/765,637

(22) PCT Filed: Nov. 19, 2018

(86) PCT No.: PCT/JP2018/042607
§ 371 (c)(1),
(2) Date: Jul. 29, 2020

(87) PCT Pub. No.: WO2019/102954
PCT Pub. Date: May 31, 2019

(65) Prior Publication Data
US 2020/0364493 A1 Nov. 19, 2020

(30) Foreign Application Priority Data

Nov. 21, 2017 (JP) .............................. JP2017-223272

(51) Int. Cl.
*G06K 9/62* (2006.01)
*G06F 16/51* (2019.01)
(Continued)

(52) U.S. Cl.
CPC .............. *G06K 9/623* (2013.01); *G06F 16/51* (2019.01); *G06F 16/535* (2019.01); *G06F 16/538* (2019.01); *G06F 16/583* (2019.01)

(58) Field of Classification Search
None
See application file for complete search history.

(56) References Cited

U.S. PATENT DOCUMENTS

2003/0099379 A1* 5/2003 Monk ................ G06K 9/00442
382/115
2010/0005096 A1* 1/2010 Minagawa ........... G06K 9/2054
707/E17.039

(Continued)

FOREIGN PATENT DOCUMENTS

JP 2002-073689 A 3/2002
JP 2003-132062 A 5/2003

(Continued)

OTHER PUBLICATIONS

International Search Report dated Jan. 29, 2019 issued in corresponding PCT/JP2018/042607 application (2 pages).

(Continued)

*Primary Examiner* — Bernard Krasnic
(74) *Attorney, Agent, or Firm* — Millen, White, Zelano & Branigan, P.C.; William F. Nixon

(57) ABSTRACT

Provided are an identifying device, an identification method, an identification system, and a database structure capable of identifying species of organisms including animals, insects, and plants. The identifying device for identifying organisms includes a reception unit for receiving feature information including at least one of a location, date and time, image data, attribution information of the image data, and a keyword representing a feature of the organism transmitted from a user terminal, and an identification unit for identifying the species of the organism based on the feature information received by the reception unit by referring to a database in which species of organisms are stored in association with the feature information.

13 Claims, 13 Drawing Sheets

(51) Int. Cl.
*G06F 16/535* (2019.01)
*G06F 16/583* (2019.01)
*G06F 16/538* (2019.01)

(56) References Cited

U.S. PATENT DOCUMENTS

2010/0322483 A1   12/2010   Margolis et al.
2014/0304600 A1*  10/2014   Chu .................... G06F 3/0481
                                              715/716
2020/0176079 A1*   6/2020   Stevens ................. G16B 30/00

FOREIGN PATENT DOCUMENTS

| JP | 2004070889 A | 3/2004 |
| JP | 2007-102575 A | 4/2007 |
| JP | 2007-133816 A | 5/2007 |
| JP | 2009-259096 A | 11/2009 |
| JP | 2011-253424 A | 12/2011 |
| JP | 2012-079273 A | 4/2012 |
| JP | 2012-205130 A | 10/2012 |
| JP | 2015-132994 A | 7/2015 |
| KR | 10-1481323 B1 | 1/2015 |

OTHER PUBLICATIONS

English Abstract of KR 10-1481323 B1 published Jan. 14, 2015.
English Abstract of JP 2009-259096 A published Nov. 5, 2009.
English Abstract of JP 2007-133816 A published May 31, 2007.
English Abstract of JP 2015-132994 A published Jul. 23, 2015.
English Abstract of JP 2007-102575 A published Apr. 19, 2007.
English Abstract of JP 2002-073689 A published Mar. 12, 2002.
English Abstract of JP 2003-132062 A published May 9, 2003.
English Abstract of JP 2012-079273 A published Apr. 19, 2012.
English Abstract of JP 2012-205130 A published Oct. 22, 2012.
English Abstract of JP 2011-253424 A published Dec. 15, 2011.

* cited by examiner (a) (b)

(a) (b)

(a) (b)

(a) (b)

IDENTIFICATION DEVICE, IDENTIFICATION METHOD, IDENTIFICATION SYSTEM, AND DATABASE

TECHNICAL FIELD

The present invention relates to an identifying device, an identification method, an identification system, and a database structure capable of identifying species of organisms including animals, insects, and plants.

BACKGROUND ART

For example, as a conventional method for identifying tree species, a method is known in which image data showing the current state of the forests is divided into small blocks and the tree species of each small block in the image data is identified. Further, a method for extracting a tree species distribution is known in which a plurality of pieces of band data blocks is acquired based on an analysis proper time of tree species, a target extraction map of each tree species in which the upper and lower limit values are set for the luminance value of each band data block is generated to subject the NDVI of each tree species to mask processing.

Spectral data obtained by a multi-band sensor or a hyper spectrum sensor has spectral data including wavelength information and light intensity information for each coordinate of the image (i.e., for each picture element or pixel). It can be said that the spectral data is three-dimensional structure data having a two-dimensional element as an image and an element as spectral data.

On the other hand, since the reflection spectrum has characteristics according to tree species, it has become possible to identify the tree species by using hyperspectral data from which spectral data can be obtained with high accuracy. That is, it is possible to identify plants by comparing the reference spectrum of the tree to be identified with the spectral data of the identification target to obtain the degree of similarity by a spectral angle mapper (Spectral Angle Mapper) or the like and extracting an image element or a pixel having a higher degree of similarity.

PRIOR ART DOCUMENT

Patent Document

Patent Document 1: Japanese Unexamined Patent Application Publication No. 2014-206392

SUMMARY OF THE INVENTION

Problems to be Solved by the Invention

However, conventional identification of species of plants is based on images or spectral analyses and is mainly used for researches or commerce, and for example, individual users or the like cannot enjoy easily identifying species of organisms including animals or insects.

The present invention has been made to solve the above-described problems, and an object of the present invention is to provide an identifying device, an identification method, an identification system, and a database structure capable of identifying species of organisms including animals and insects.

Means for Solving the Problem

In order to solve the above-mentioned problems, an identifying device of the present invention is an identifying device for identifying organisms. The identifying device is provided with a reception unit configured to receive feature information including at least one of a location, date and time, image data, and attribution information of the image data, and a keyword representing a feature of the organism, the feature information being transmitted from a user terminal; and an identification unit configured to identify a species of the organism based on the feature information received by the reception unit by referring to a database in which species of organisms are stored in association with feature information.

According to the above-described configuration, the species of an organism is identified based on feature information including at least one of a location, date and time, image data, and attribution information of the image data, and a keyword representing the features of the organism, which are transmitted from a user terminal, by referring to a database in which species of organisms are stored in association with feature information. Therefore, unlike a large-scale method in which spectral data, etc., is obtained, an individual user or the like can enjoy easily identifying species of organisms including animals and insects. Further, in the case of identifying a species of an organism using one or more pieces of information including location data, time data, and a keyword, the communication data volume and the calculation amount can be reduced because the data volume required for identification is small. Further, species of organisms can be easily identified.

In the identification unit of the identifying device according to the present invention, in cases where there exists a plurality of species to be identified, the identification unit may further narrow down species based on information different from the information used for identifying the species among the feature information.

According to the above-described configuration, in cases where there exists a plurality of species to be identified, since the species is further narrowed down based on information different from the information used for the identification among the feature information, the number of species to be presented to the user does not become too many, so that the user can enjoy the identification of organisms without stress. Further, in cases where there exists a plurality of species to be identified, the species is further narrowed down, and therefore the communication traffic volume and the calculation amount can be further reduced.

The identification unit of the identifying device according to the present invention may further narrow down the species based on the image data and/or the attribution information of the image data transmitted from a user terminal.

According to the above-described configuration, the improvement of the identification accuracy can be expected because the species are further narrowed down based on the image data and/or the attribution information of the image data transmitted from a user terminal. Further, the improvement of the identification accuracy can be further expected in cases where the attribution information of the image data is used in addition to the image data. Further, since the image data and/or the attribution information of the image data is used when the narrowing-down, it is not necessary to transmit the image data and/or the attribution information of the image data having a large data volume first.

The identifying device according to the present invention may further include an information extraction unit configured to extract information for making a user narrow down the species in cases where there exists a plurality of species to be identified and a first transmission unit configured to transmit the information extracted by the information extraction unit to the user terminal.

According to the above-described configuration, since the information for making a user narrow down the species is extracted and the extracted information is transmitted to a user terminal, a user can narrow down the species based on the information transmitted from the identifying device.

The identifying device according to the present invention may have a function to ask other users a question about the species in cases where there exists a plurality of species to be identified.

According to the above-described configuration, since a question can be made to other users about the species, it is possible to achieve exchanges between users. Further, the species identified by the identification unit can be confirmed with other users.

The identifying device according to the present invention may further include a question extraction unit configured to extract a question to narrow down the species in cases where there exists a plurality of species to be identified, and a second transmission unit configured to transmit the question extracted by the question extraction unit to the user terminal.

According to the above-described configuration, since the question to narrow down the species is extracted and the extracted question is transmitted to a user terminal, the species can be narrowed down according to an answer from a user and an improvement of the identification accuracy can be expected. Further, since a large amount of image data is not transmitted, the data volume is small, so that the communication traffic volume and the calculation amount can be reduced.

In the identification unit of the identifying device according to the present invention, in cases where there exists a plurality of species to be identified, the identification unit may further narrow down the species based on a keyword included in the feature information.

According to the above-described configuration, in cases where there exists a plurality of species to be identified, the identification unit further narrows down the species based on a keyword included in the feature information. Therefore, it is possible to perform accurate identification with thigh accuracy without communicating with a user terminal again. Further, in cases where the information on the location and/or the time is used to identify the species of the organism at the time of the identification, since image data having a large amount of information is not required to be transmitted and therefore the data volume is small, the communication traffic volume and the calculation amount can be reduced.

The identifying device according to the present invention may include a point awarding unit configured to award a point to the user depending on an appearance probability of the organism and/or a degree of correspondence to other users.

According to the above-described configuration, a point is awarded to a user according to the appearance probability of the organism and/or the degree of correspondence to other users. Therefore, the registration of the organism to the database is promoted. As a result, the identification accuracy of organisms is improved. Further, a point is awarded depending on the degree of correspondence to users, for example, answering questions from other users or posting useful information, thereby facilitating the exchange between users.

The identifying device according to the present invention may further include a calculation unit configured to calculate an appearance probability of the organism.

According to the above-described configuration, since the appearance probability (rareness) of the organism is calculated, it can be expected that users will perform the identification of organisms one after another in order to find organisms with a lower appearance probability (higher rareness), which promotes the registration of organisms to the database. As a result, the identification accuracy of organisms is further improved. Furthermore, by posting eyewitness information or the like, the exchange between users can be further promoted.

The identifying device according to the present invention may further include a presentation unit configured to present at least one of an organism inhabiting in a surrounding region, an organism inhabiting in a different time period and/or a different season, and an event, based on the feature information transmitted from the user terminal.

According to the above-described configuration, since at least one or more of an organism inhabiting in a surrounding region, an organism inhabiting in a different time period and/or a different season, and an event is presented, it is possible to expect users to go out to the presented region or location, which can be utilized for the revitalization of a region, a town, or the like.

The identifying device according to the present invention may further include a judgment unit configured to judge whether or not the species identified by the identification unit is a predetermined species, and a third transmission unit configured to transmit the information to a predetermined user terminal in cases where a judgment result by the judgment unit is the predetermined species.

According to the above-described configuration, since it is judged whether or not the species identified by the identification unit is a predetermined species, and when the judgment result is a predetermined species, the information is transmitted to a predetermined user terminal. Therefore, for example, when a predetermined species, such as, e.g., a non-native species and an endangered species, is discovered, the information is automatically notified to a specialized research institute or the like immediately. Further, since such information is automatically collected, it is highly convenient.

The database structure according to the present invention includes block information in which a map is divided into a plurality of blocks, position information associated with each block information, time information associated with each block information, and species information of organisms associated with the time information.

According to the above-described configuration, since it includes feature information including at least one of a location, date and time, image data, attribution information of the image data, and a keyword representing a feature of an organism, and species information of the organism associated with the feature information, it is possible to identify the species of the organism only with any one of the information of the location, the date and time, the image data, the attribution information of the image data, and the keyword representing the feature of the organism.

Effects of the Invention

As described above, according to the present invention, it is possible to provide an identifying device, an identification method, an identification system, and a database structure capable of identifying species of organisms including animals, insects, and plants. More particularly, it is possible to provide an identifying device, an identification method, an identification system, and a database structure capable of identifying species of organisms based on location information and time information.

EMBODIMENTS FOR CARRYING OUT THE INVENTION

Hereinafter, some embodiments of the present invention will be described with reference to the attached drawings. The "organism" of the present invention is a general term for living things, such as, e.g., animals, plants, microorganisms, and insects, which are composed of units called cells and perform biological activities, such as, e.g., self-propagation, irritation response, growth, and metabolism.

Embodiment

Figure 1:
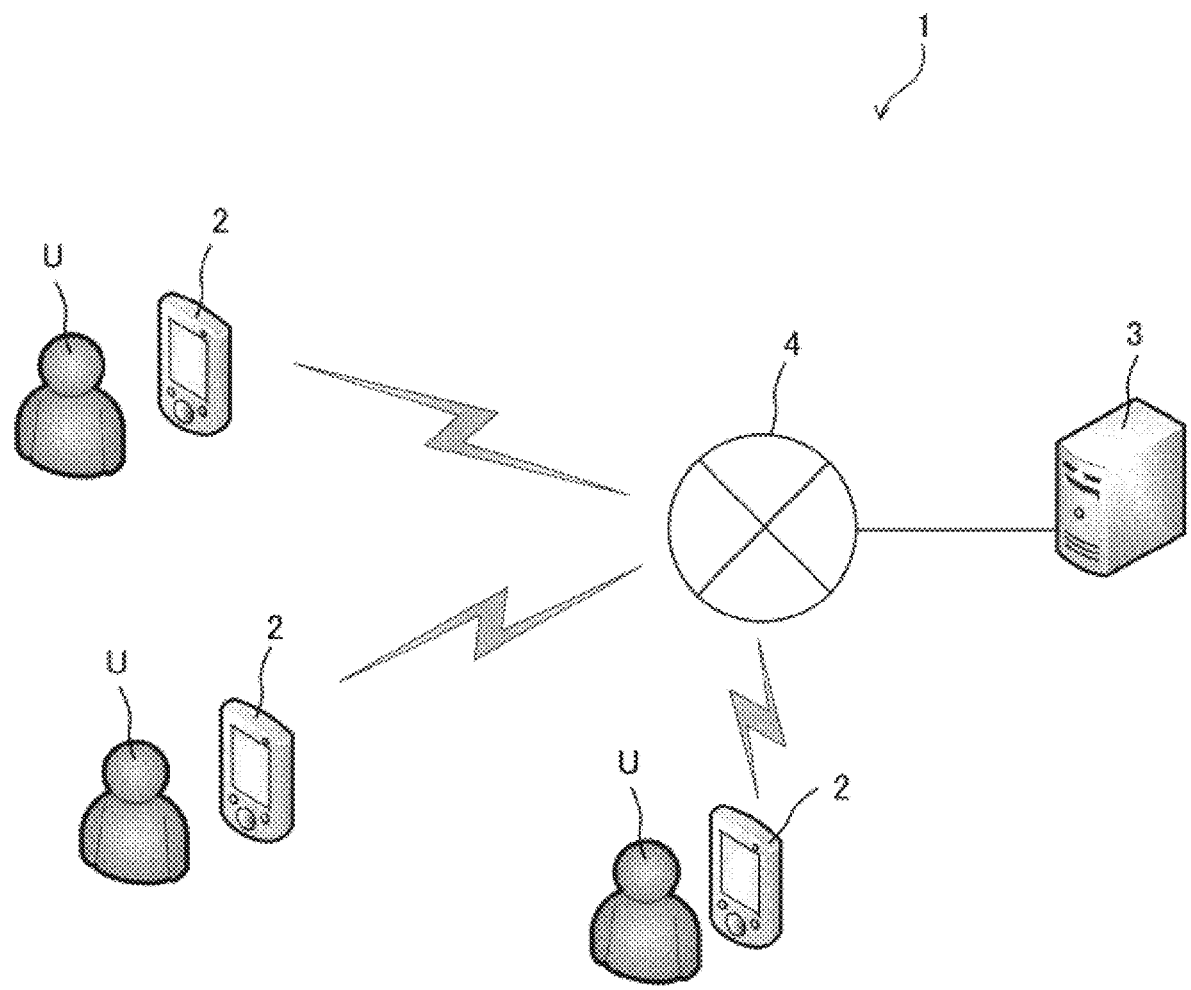
FIG. 1 is a schematic diagram showing an identification system according to an embodiment.

First, the configuration of the identification system 1 will be described with reference to FIG. 1. The identification system 1 is provided with at least a plurality of user terminals 2 and a server 3 connected to the plurality of user terminals 2 via a network 4.

Figure 2:
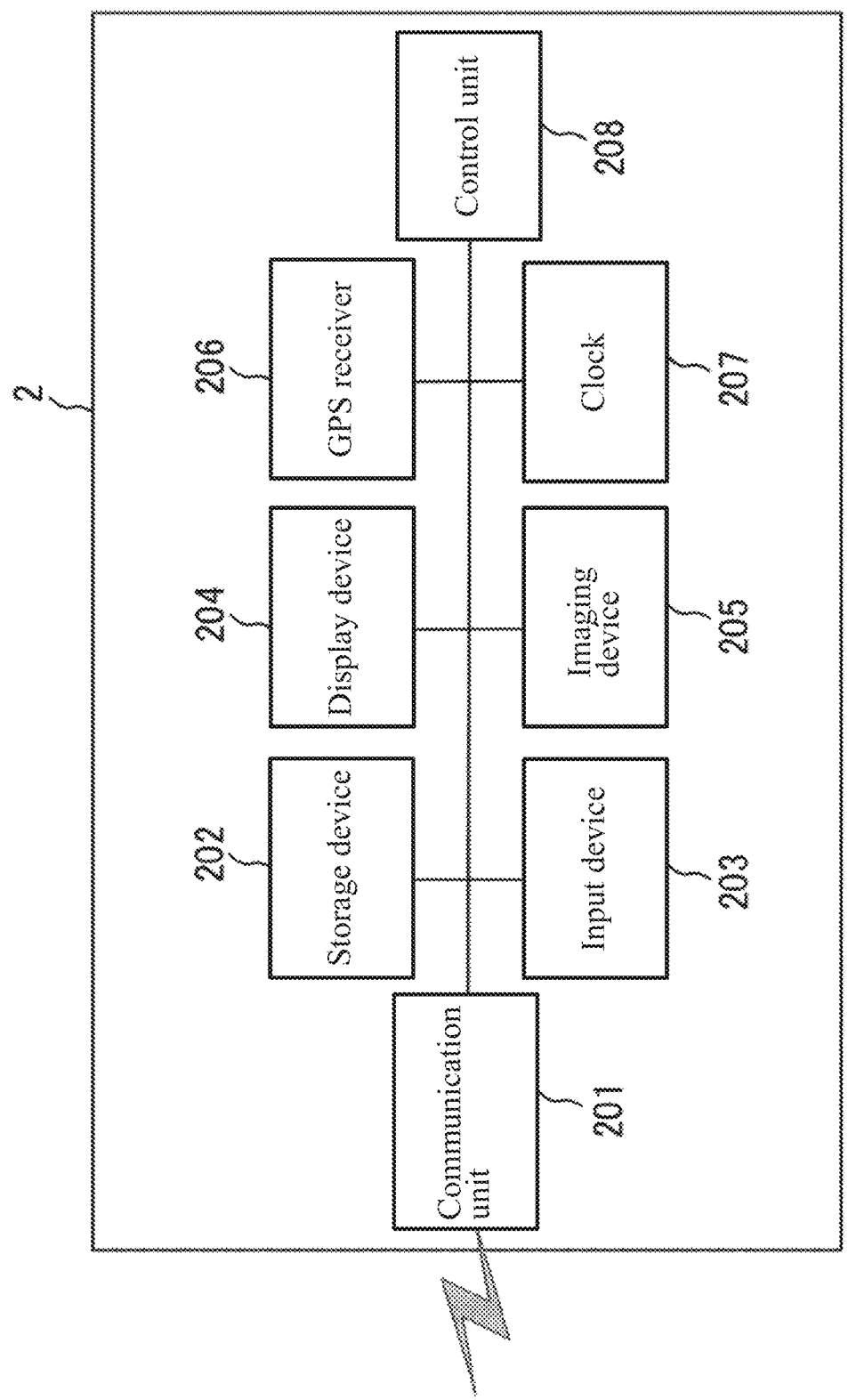
FIG. 2 is a configuration of a user terminal according to an embodiment.

FIG. 2 shows the configuration of the user terminal 2. The user terminal 2 is a mobile terminal (e.g., a smartphone, a tablet terminal, a PDA, etc.). The user terminal 2 is provided with at least a communication unit 201 (a transmission unit and a reception unit), a storage device 202, an input device 203, a display device 204, an imaging device 205, a GPS receiver 206, a clock 207, and a control unit 208.

The communication unit 201 receives data transmitted from the server 3, for example, data, etc., to be displayed on the display device 204, via the network 4. The communication unit 201 transmits the data such as the input content received by the input device 203 to the server 3 via the network 4.

The storage device 202 is, for example, an HDD (Hard Disk Drive) or a semiconductor storage device (SSD (Solid State Drive), etc.). Further, the storage device 202 stores an identifier unique to each user terminal 2.

The input device 203 is, for example, a keyboard, a mouse, a touch panel, or the like. The user U can operate the input device 203 to perform operations, such as, e.g., a user registration, a login, an entry of a keyword, capturing of images or videos (hereinafter also referred to as "image, etc.", including images and videos) of organisms necessary for identifying organisms according to the embodiment.

The display device 204 displays a screen based on the data transmitted from the server 3. The screen includes, for example, at least a user registration screen, a login screen, or a screen for entering items required for identifying organisms.

The imaging device 205 is, for example, a camera using an image sensor, such as, e.g., a solid-state image sensor element (for example, CMOS (complementary MOS), CCD (Charge Coupled Device)) installed in a smartphone. A user U captures an image and a video of an organism whose species the user U wants to identify by using the imaging device 205. The image or the video captured by the imaging device 205 is transmitted to the server 3 as image data or video data.

The GPS receiver 206 calculates and outputs the current location of the user terminal 2 in which the receiver is installed. Specifically, the GPS receiver 206 receives signals of the times transmitted by three GPS satellites and calculates the distances to the satellites from the differences in the times at which the signals were received. Next, the GPS receiver 206 identifies the location of the receiver by measuring the distances from the three GPS satellites. Then, the GPS receiver 206 receives a signal of the time transmitted by a fourth GPS satellite and uses the time transmitted by the fourth GPS satellite to calculate a more accurate current location by correcting the current location calculated from the three GPS satellites.

The clock 207 outputs the current time. The clock 207 implements an RTC (real-time clock) or the like. The clock 207 recognizes the time based on the byte data (time information) of seconds, minutes, hours, days of the week, days, months, and years generated by the RTC. Note that the RTC alone does not have information for identifying whether it is the UTC or the local time (which time zone it belongs to), but the clock 207 retains these pieces of information, performs the conversions necessary for the time information generated by the RTC, and recognizes and outputs the time (date and time).

The control unit 208 controls the user terminal 2.

Figure 3:
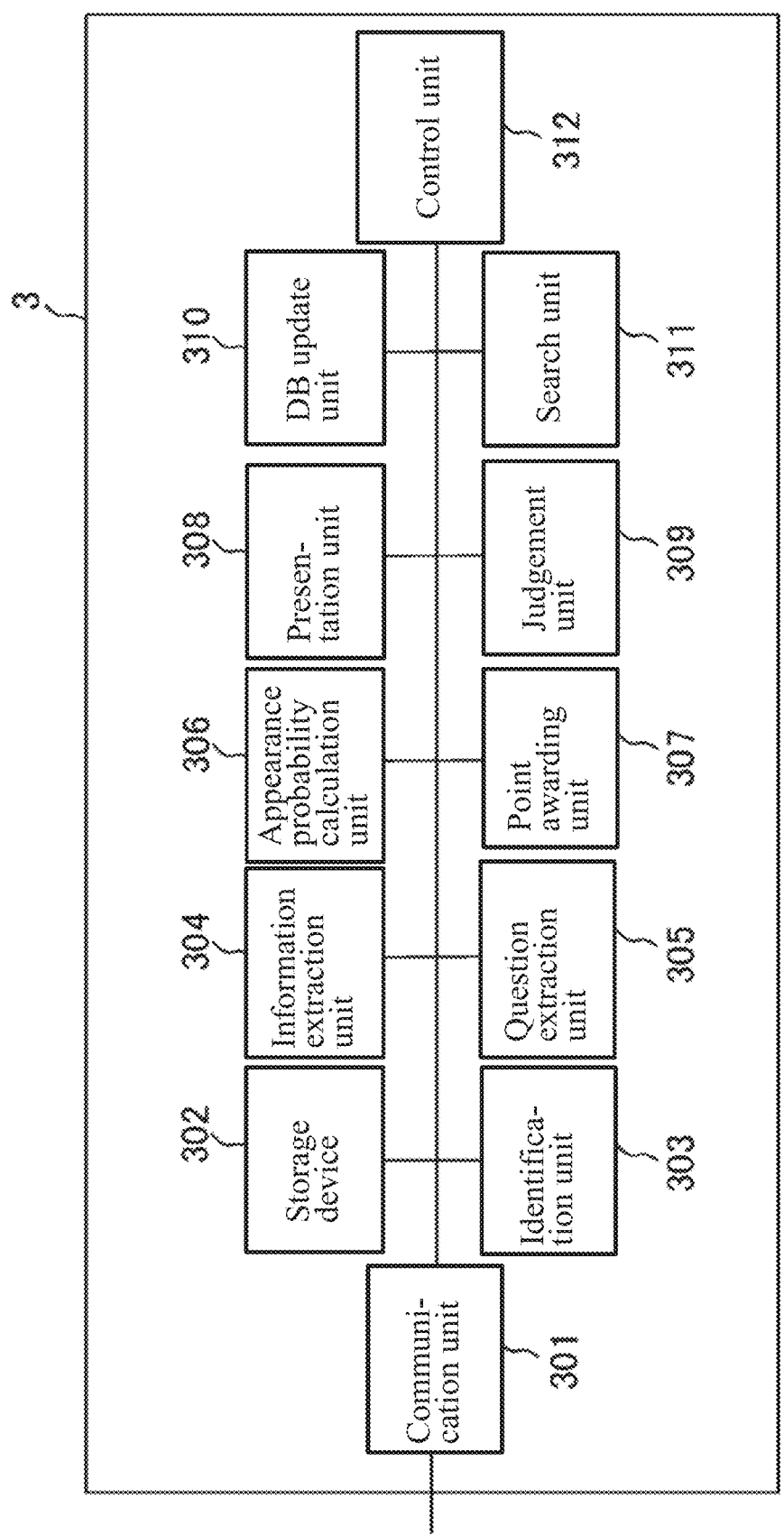
FIG. 3 is a configuration of a server (identifying device) according to an embodiment.

FIG. 3 is a configuration diagram of the server 3. The server 3 is provided with: at least a communication unit 301 (a transmission unit and a reception unit); a storage device 302; an identification unit 303; an information extraction unit 304; a question extraction unit 305; an appearance probability calculation unit 306; a point awarding unit 307; a presentation unit 308; a judgment unit 309; a DB update unit 310; a search unit 311; and a control unit 312. The server 3 includes, for example, a CPU, a RAM, a ROM, etc., and the functions shown in FIG. 3 are realized by the CPU performing the identification program.

The communication unit 301 receives the data transmitted from the user terminal 2 via the network 4. This data includes data entered by a user U using the input device 203, for example, attribution information input at the time of user registration, data input at the time of the login, attribution data, such as, e.g., a keyword, data such as an image of an organism imaged by an imaging device 205, or an image, data of the current location output from a GPS receiver 206, data of the current time including the year, month, date, hour, minute, and second output from the clock 207, and the like. The communication unit 301 transmits, via the network 4, the species of the identified organism, the image data of the species, and the attribution data, to the user terminal 2.

Figure 4:
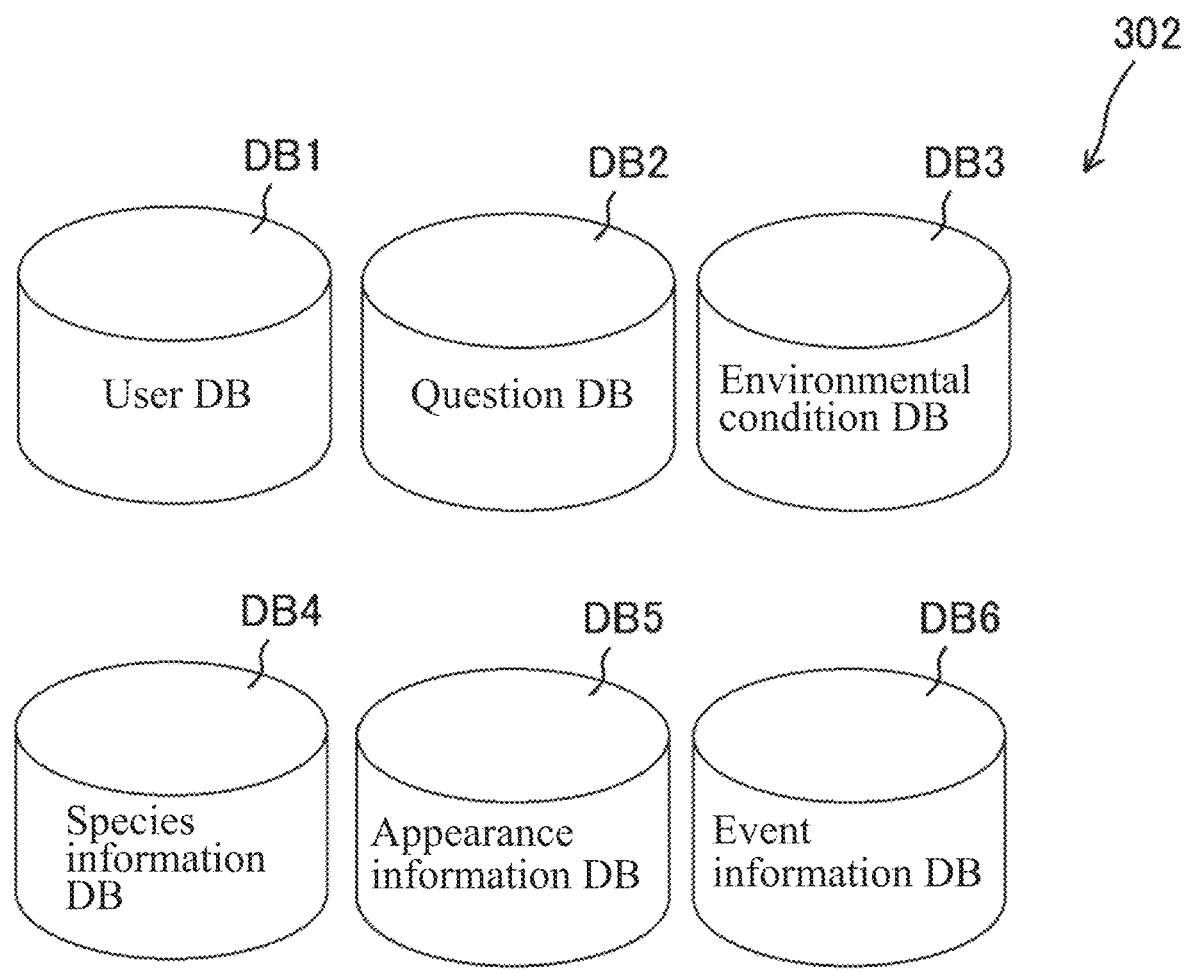
FIG. 4 is one example of a database stored in a storage device of a server (identifying device) according to an embodiment.

The storage device 302 is, for example, an HDD (Hard Disk Drive) or a semiconductor storage device (SSD (Solid State Drive)). As shown in FIG. 4, the storage device 302 is storing databases, such as, e.g., a user database DB1, a question database DB2, an environmental condition database DB3, a species information database DB4, an appearance information database DB5, and an event information database DB6.

The user database DB1 is storing the attribution data of users U, e.g., data of user names, login IDs, contacts, etc., for each user U in association with the user ID.

The question database DB2 is storing questions to be transmitted to the user terminal 2 to let a user U answer in order to narrow down the species in cases where there exists a plurality of species to be identified based on the information transmitted from the user terminal 2.

The environmental condition database DB3 to the appearance information database DB5 are databases in which data for identifying the species of an organism based on the information transmitted from the user terminal 2 are stored. The environmental condition database DB3 is storing a meteorological data table and an environmental condition table. The meteorological data table stores meteorological data of the region for each mesh, and is storing, for example, the tertiary mesh code, the monthly average temperature, the altitude, etc., in association with each other. Further, the environmental condition table stores information about the environmental condition configuration of the region, such as, e.g., the percentage of coniferous forests and the percentage of urban regions for each quinary mesh, and for example, the coverage ratio for each quinary mesh code and each vegetation type is stored in association with each other.

The species information database DB4 is storing an all species list table. The all species list table stores the list of species handled by the system, and for example, the species ID, the Japanese name, the scientific name, etc., are stored in association with each other. Further, image data and attribution data of the image data (for example, the outline of the organism or the feature of the color) are associated with each other for each species ID. Further, the species information database DB4 is storing the information used for the judgment in the judgment unit 309 described later. Specifically, each species ID is associated with information for judging whether or not a species is a predetermined species, for example, a non-native species or an endangered species is associated with the information.

The appearance information database DB5 is storing a post information table, an environmental condition count table, a biodistribution information table, and a machine learning parameter table. The post information table stores posts from users U, and is storing, for example, user IDs, post IDs, species IDs, location information, date and time information, mesh codes, etc., in association with each other. The environmental condition count table is used for aggregating the number of times each species has been found in the past for each environmental condition and is storing, for example, the species ID and the number of posts for each environmental condition in association with each other.

The biodistribution information table is for storing the appearance information of an organism aggregated from existing academic data, etc., and is storing, for example, the species ID, the mesh code, and the date and time information are stored in association with each other. Here, for the aggregation from the existing academic data, etc., only data having the location and time information is subject to collection to be stored in the biodistribution information table. Since the accuracy of the location information of each data are different, the weighting of the distribution information is performed according to the accuracy (for example, the mesh scale). For example, since the quinary mesh has higher accuracy (mesh scale is smaller) than the primary mesh, the weighting of the distribution information is heavier for the quinary mesh than for the primary mesh.

Further, the machine learning parameter table stores parameters (for example, season, the time period (morning, noon, night, etc.), and weather) for calculating the appearance probability of each species due to the temperature, etc., and for example, the species ID and each of the parameters are stored in association with each other.

Here, block information is data obtained by dividing the whole of Japan into meshes based on the standards of "Standard regional mesh systems" defined by the national government and includes 20 km square primary meshes, 5 km square secondary meshes, 1 km square tertiary meshes, 500 m square quaternary meshes, 250 m square quinary meshes, etc. An identification number (mesh code) is assigned to each mesh. Here, the identification number of each mesh includes information of which mesh it is, and it is possible to recognize from the identification number of each mesh that the block to which this identification number is assigned corresponds to which of the primary mesh to the quinary mesh. Note that this mesh data may be data obtained by dividing not only Japan but also the entire earth including the ocean into blocks in a mesh shape, and an identification number (mesh code) may be assigned to each block. The mesh size is not limited to the above-described 20 km square, 5 km square, 1 km square, 500 m square, and 250 m square, and can be set arbitrarily. Further, the shape of the mesh is not limited to a rectangular shape and may be, for example, a curve or a combination of a straight line and a curved line.

The event information database DB6 is storing an event information table, which is event information related to outdoor activities throughout the country. The event information table is for presenting the event information to a user U, and is storing, for example, an event ID, date and time, a venue (location information), and information about observed organisms, etc., in association with each other.

The identification unit 303 refers to a database stored in the storage device 302 and identifies the species of an organism based on the information transmitted from the user terminal 2. The details of the operation of the identification unit 303 will be described later.

In cases where there exists a plurality of species to be identified by the identification unit 303, the information extraction unit 304 extracts information for making a user U narrow down the species from the database stored in the storage device 302. The information extracted by the information extraction unit 304 is transmitted to the user terminal 2 via the communication unit 301.

In cases where there exists a plurality of species to be identified by the identification unit 303, the question extraction unit 305 extracts a question for narrowing down the species from the question database DB2 of the storage device 302. The question extracted by the question extraction unit 305 is transmitted to the user terminal 2 via the communication unit 301. The submitted question is displayed on the display device 204 of the user terminal 2. The user U operates the input device 203 to input an answer to the question. The input answer is transmitted to the server 3 via the communication unit 201 of the user terminal 2.

The appearance probability calculation unit 306 calculates the appearance probability (rareness) of the organism registered by the user U. Specifically, when the user U registers an organism discovered by operating the user terminal 2, the appearance probability calculation unit 306 calculates the appearance probability (rareness) of the registered organism based on the biodistribution information table and the machine learning parameter table information stored in the appearance information database DB5 of the storage device 302. The calculated appearance probability (rareness) is stored in association with the registered organism and presented when the user U displays the previously registered organism on the display device 204 of the user terminal 2.

The point awarding unit 307 awards a point to a user U according to the appearance probability of the registered organism and/or the degree of correspondence to other users U. In this case, for example, a higher point can be awarded as the rareness of the registered organism is higher, or a higher point can be awarded as the number of answers of other users U to the question is higher. The points awarded by the point awarding unit 307 may be used when participating in an event or obtaining responses from other users U. Further, it may be configured such that rare information (for example, information about a location, date and time, etc., where an organism with a very low appearance probability is found) is given in accordance with the awarded points.

The presentation unit 308 refers to the database stored in the storage device 302 and presents at least one or more of an organism inhabiting in the surrounding, an organism living in a different time period and/or a different season, and an event, based on the information transmitted from the user terminal 2.

The judgment unit 309 refers to the database stored in the storage device 302 and judges whether or not the species identified by the identification unit 303 is a predetermined species, for example, a non-native species or an endangered species. When the judgment result by the judgment unit 309 is a predetermined species, the information is transmitted to a predetermined user terminal 2 (for example, a terminal of a specialized research institute, etc.) via the communication unit 301. The predetermined species may include species found in a region where it does not normally inhabit. For example, when a species that is considered not to live in Hokkaido by a conventional theory is found in Hokkaido, a transmission may be made to a predetermined user terminal 2 (for example, a terminal of a specialized research institute, etc.) via the communication unit 301. In this case, the judgment unit 309 makes a judgment using not only information from the species information database DB4 but also information from the biodistribution information table of the appearance information database DB5.

The DB update unit 310 updates each database stored in the storage device 302 based on the information transmitted from the user terminal 2. Further, the DB update unit 310 accesses a database that is not illustrated (for example, a pre-existing scientific literature database) via the network 4 and updates each database stored in the storage device 302 based on the collected information.

The search unit 311 refers to the database stored in the storage device 302 and searches for organisms that match the search condition based on the information such as a keyword input by a user U by operating the input device 203 of the user terminal 2. The data of organisms searched by the search unit 311 is transmitted to the user terminal 2 via the communication unit 301 to be displayed on the display device 204.

The control unit 312 controls the server 3.

Next, the screens to be displayed on the display device 204 of the user terminal 2 in the embodiment will be described with reference to FIG. 5 to FIG. 10. Note that FIG. 5 to FIG. 10 are diagrams showing examples of screens displayed on the user terminal 2 according to the embodiment and are not necessarily displayed in the manner shown in FIG. 5 to FIG. 10 and can be displayed in other manners.

Figure 5:
FIG. 5 is a diagram showing an example of a screen displayed on a user terminal according to an embodiment.
Figure 5:

FIG. 5 shows examples of screens when registering an image of an organism discovered by a user U. As shown in FIG. 5(*a*), the user U captures an image of the discovered organism using the imaging device 205 of the user terminal 2. The image data captured by the imaging device 205 is transmitted to the server 3 via the communication unit 201 together with the current location information output from the GPS receiver 206 and the current time information output from the clock 207 and is registered in the storage device 302 of the server 3. Since the image data is registered together with the imaged date, time, and location (location information), information, such as, e.g., the captured image, the image-captured date and time, and the image-captured location, is displayed on the display device 204 of the user terminal 2 as shown in FIG. 5(*b*).

Figure 6:
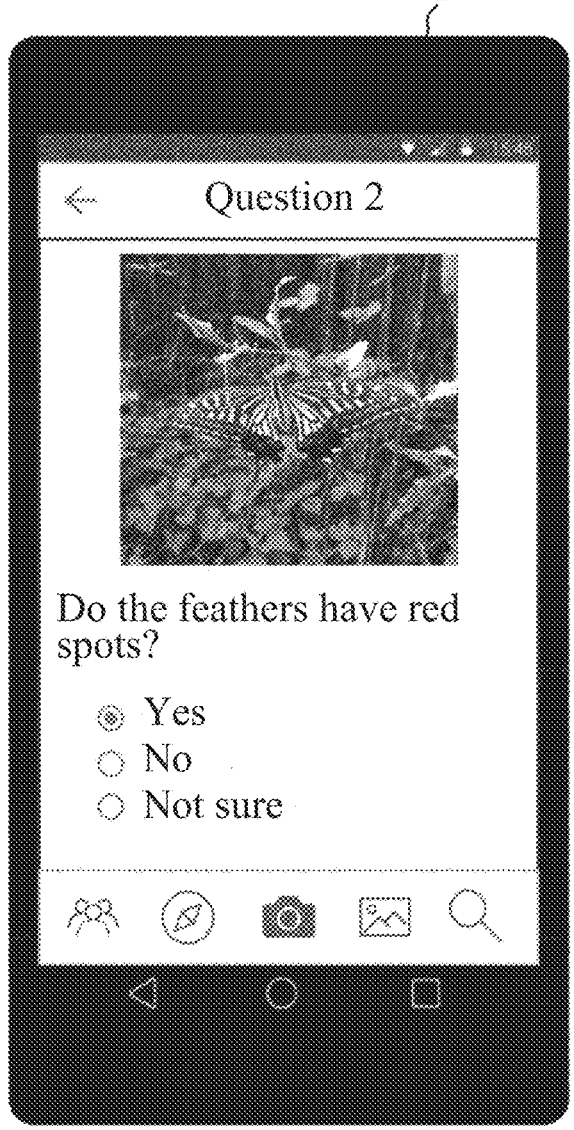
FIG. 6 is a diagram showing an example of a screen displayed on a user terminal according to an embodiment.
Figure 6:

FIG. 6 shows examples of the screens when identifying the species of the organism discovered by the user U. FIG. 6(*a*) shows an example of a screen in which a question extracted by the question extraction unit 305 is displayed on the display device 204 of the user terminal 2. In the example shown in FIG. 6(*a*), a question for narrowing down the species of the butterfly is displayed. FIG. 6(*b*) shows an example of a screen in which the narrowed butterfly species (candidate species) are displayed on the display device 204 of the user terminal 2. In the example shown in FIG. 6(*b*), an image of the narrowed down butterfly species (candidate species) and the features of the species (for example, explanatory text describing the features of the species such as a distribution, a time, a size, etc.) are displayed, and the user U makes a selection from the displayed candidates to perform the registration. If there exists no corresponding candidate, when "Not in list" in the upper right of the screen is selected, the screen will display other candidates or will transit to a screen for asking a question to other users.

Figure 7:
FIG. 7 is a diagram showing an example of a screen displayed on a user terminal according to an embodiment.
Figure 7:
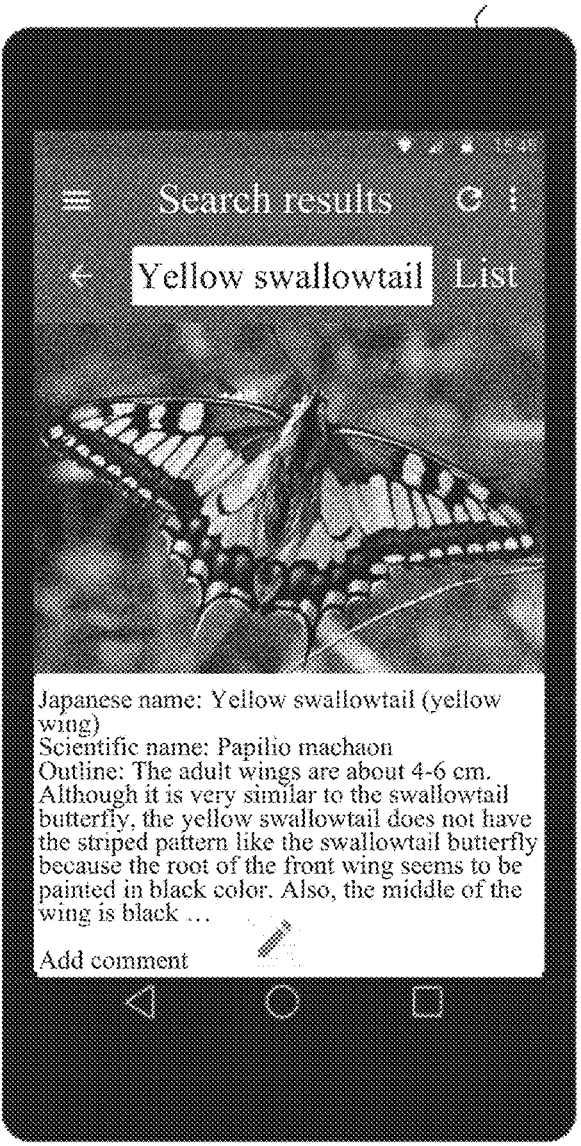

FIG. 7 shows examples of screens when a user U browses the registered organisms. FIG. 7(*a*) is an example of a screen in which the images of the organisms registered by the user U are listed. In the example as shown in FIG. 7(*a*), thumbnails of images of the registered organisms are displayed in a list format. Note that when there exists no captured image, no captured image is displayed. Further note that the total number of organisms registered by the user U may be displayed on the lower side, etc., of the screen. FIG. 7(*b*) is an example of a screen displayed when an image displayed in the list in FIG. 7(*a*) is selected (tapped). In the example as shown in FIG. 7(*b*), an enlarged image of an organism corresponding to the selected image is displayed on the upper side of the screen, and the explanatory text of the organism is displayed on the lower side of the screen.

Figure 8:
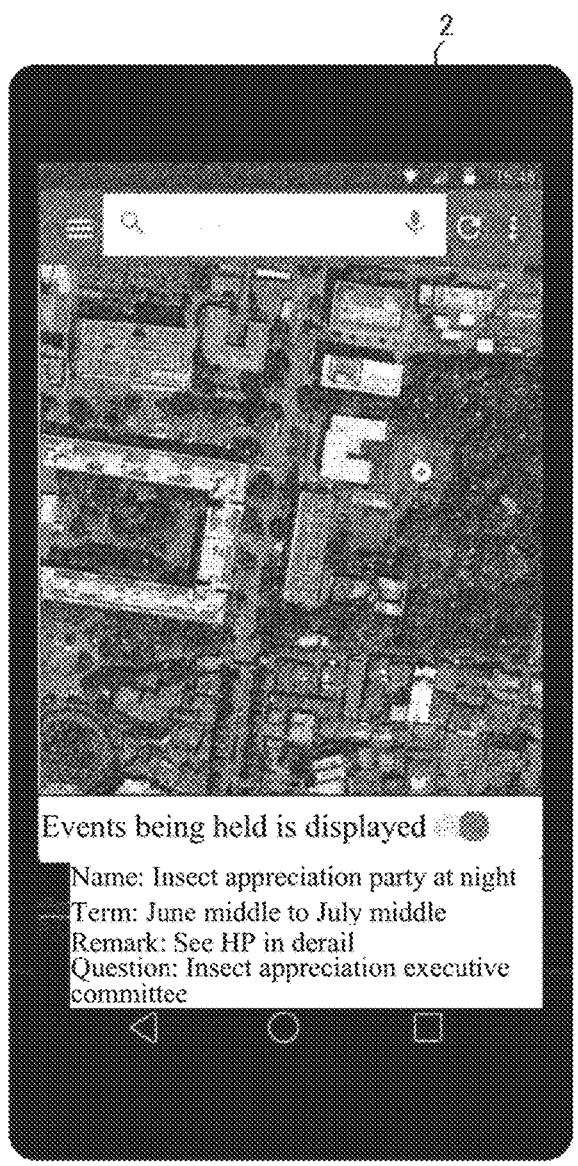
FIG. 8 is a diagram showing an example of a screen displayed on a user terminal according to an embodiment.
Figure 8:
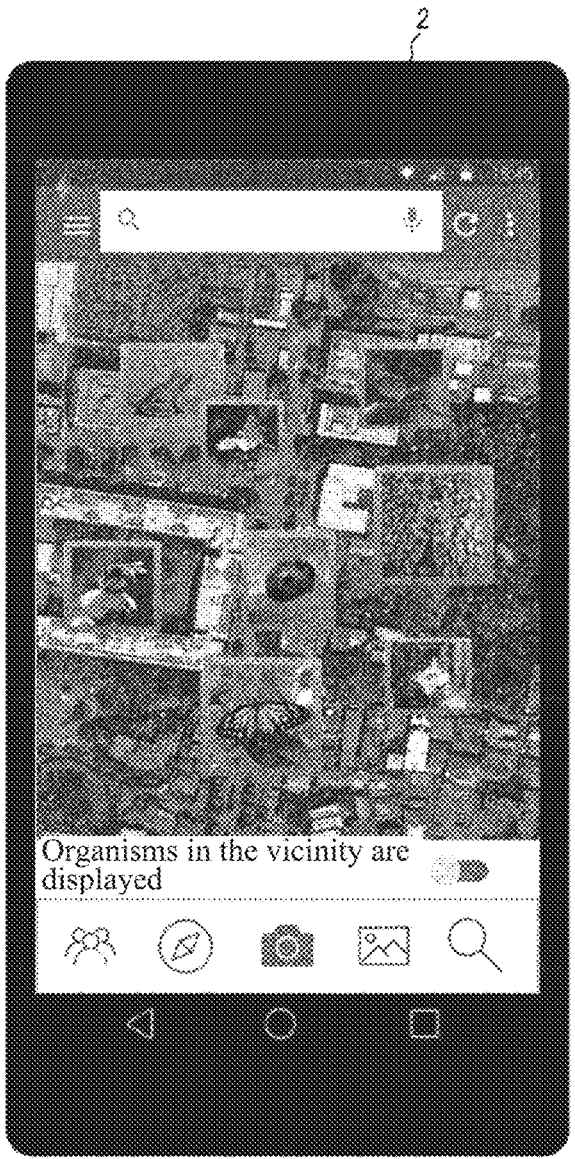

FIG. 8 shows examples of screens when displaying nearby organisms, events, etc., presented by the presentation unit 308 of the server 3. FIG. 8(*a*) is an example of a screen in which a nearby event is displayed. FIG. 8(*b*) shows an example of a screen in which nearby organisms are displayed.

Figure 9:
FIG. 9 is a diagram showing an example of a screen displayed on a user terminal according to an embodiment.

FIG. 9 shows examples of SNS (Social Networking Service) screens provided to the user U of the identification system 1. In the identification system 1 of this embodiment, an SNS that can be used by a user U as a user is provided, and the user U using the identification system 1 of this embodiment can make exchanges using this SNS. FIG. 9(*a*) is a diagram showing an example of a screen displaying a timeline TL of comments, photographs, moving images, or the like posted to the SNS. In the example as shown in FIG. 9(*a*), responses to comments, photographs, moving images, and the like (in FIG. 9(*a*), the number of comments and the number of favorites) are displayed. Further, FIG. 9(*b*) is an example of a screen of the question bulletin board. In the example shown in FIG. 9(*b*), an exchange between users U is promoted by posting questions and answers among users U. Furthermore, as shown in FIG. 9(*b*), when a question of another user U is answered, points available to be used in the SNS are awarded to the respondent by the point awarding unit 307 of the server 3. Note that the points may be made available for use in stores in the SNS, other SNS, actual stores, or the like.

Figure 10:
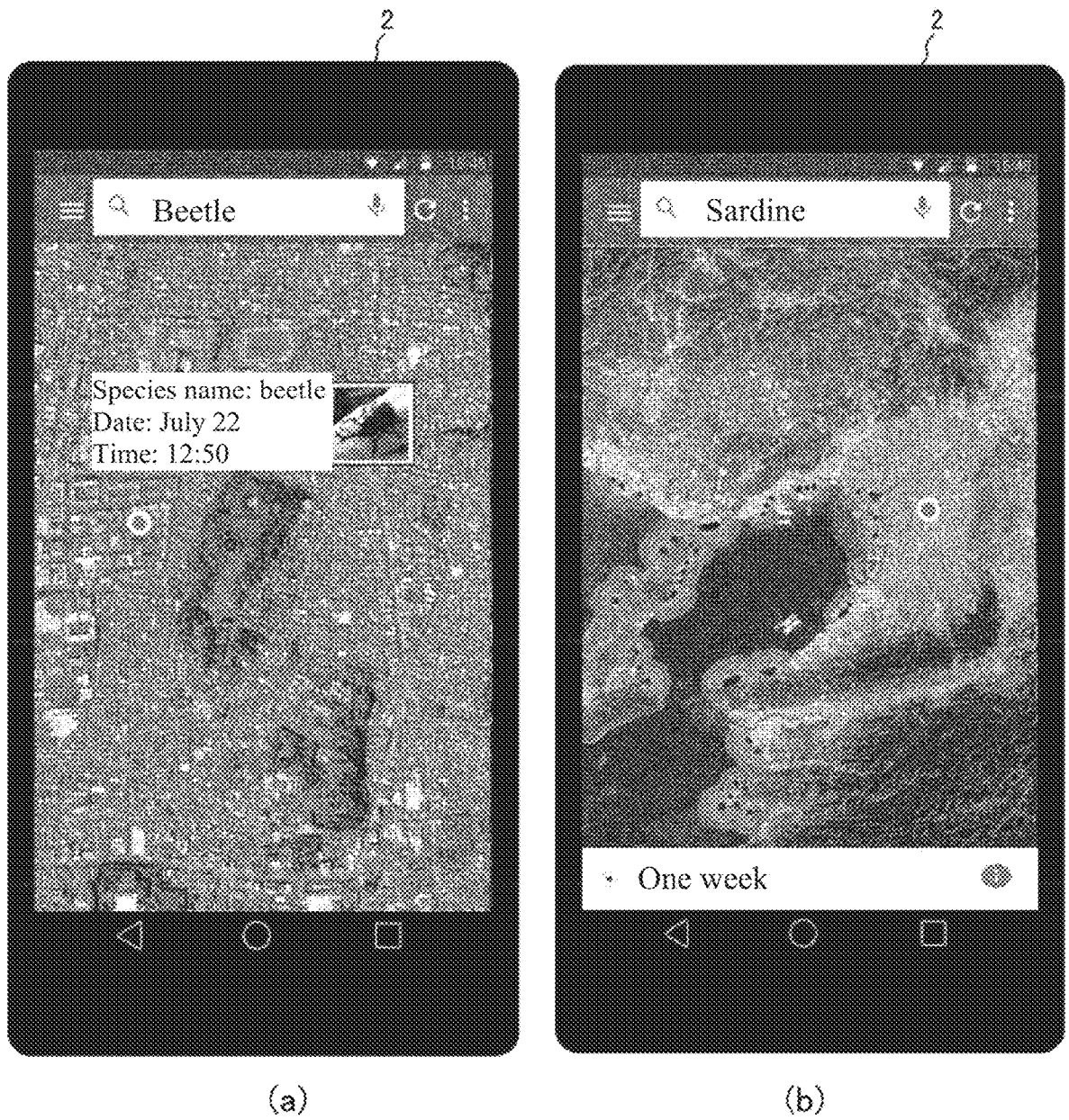
FIG. 10 is a diagram showing an example of a screen displayed on a user terminal according to an embodiment.

FIG. 10 shows examples of screens showing a search result by the search unit 311 of the server 3. In the identification system 1 of this embodiment, the database stored in the storage device 302 of the server 3 can be searched. That is, the user U can search for organisms based on the information registered by other users U or document data, etc. FIG. 10(*a*) is an example of a screen showing a result of searching for registered information of beetles found in the vicinity based on the location information output by the GPS receiver 206 of the user terminal 2. FIG. 10(*b*) is an example of a screen showing a result of searching for registered information on sardines found in the vicinity based on the location information output by the GPS receiver 206 of the user terminal 2.

Figure 11:
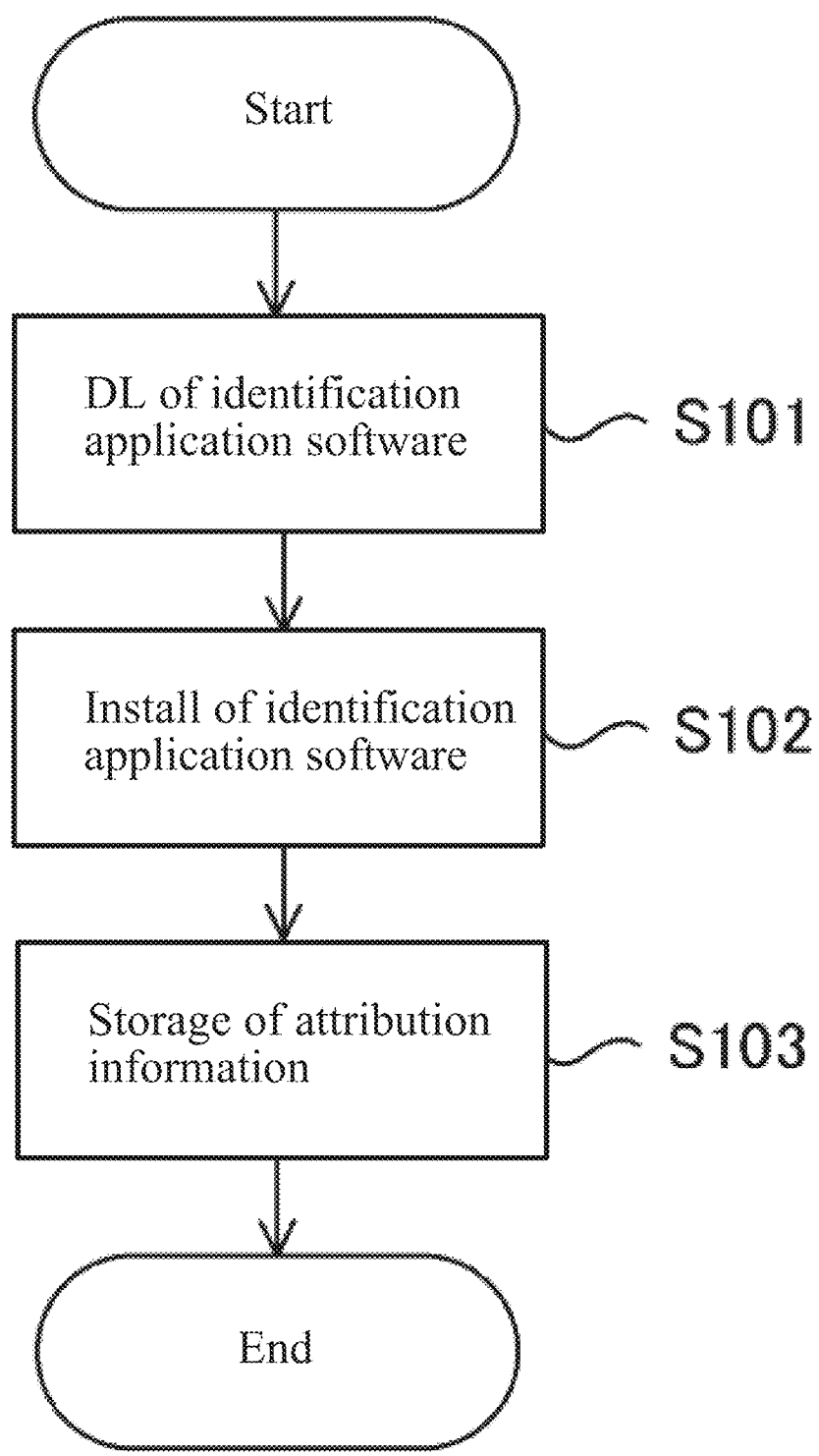
FIG. 11 is a flowchart showing an example of an operation of the identification system according to an embodiment.
Figure 12:
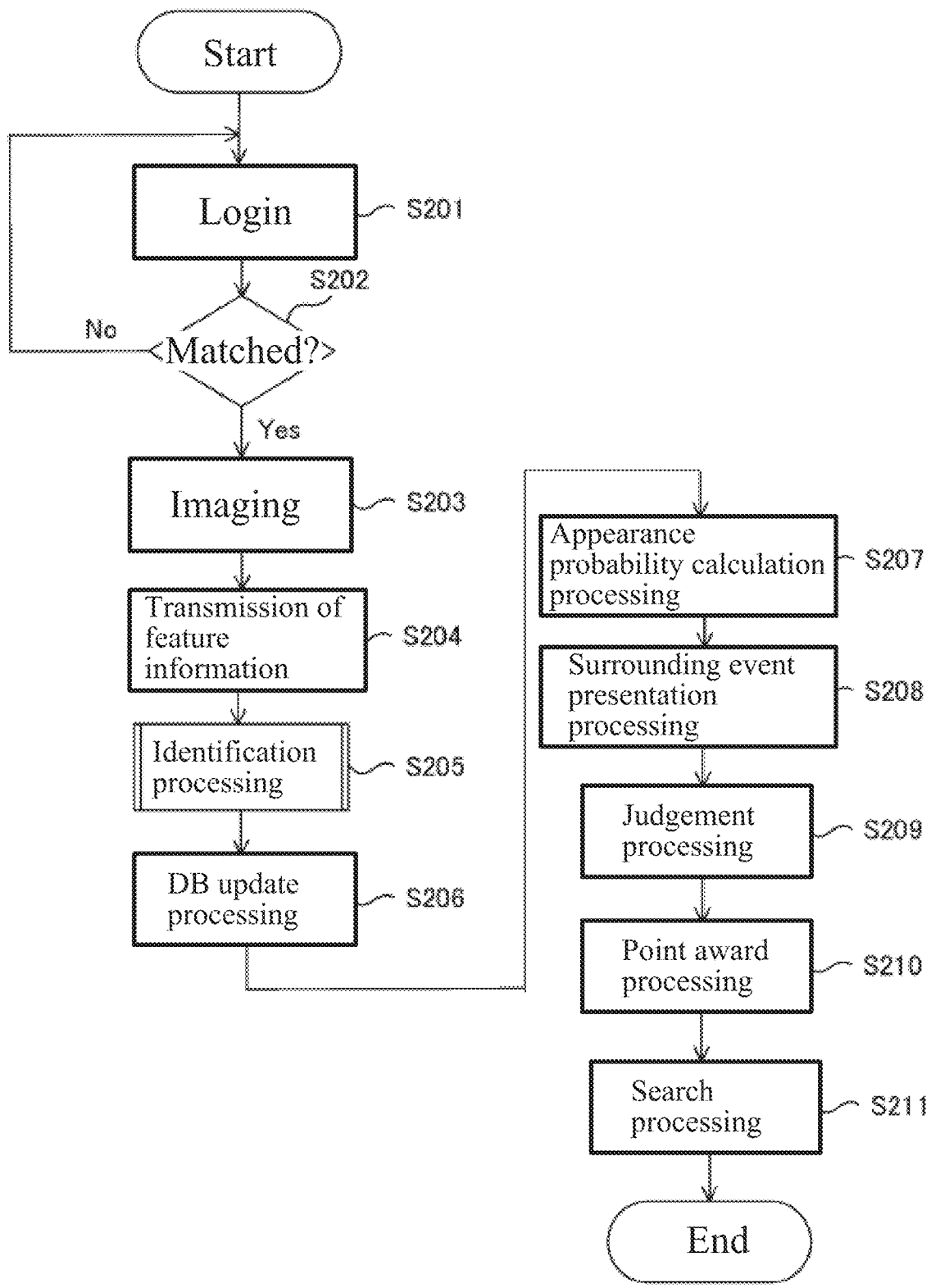
FIG. 12 is a flowchart showing an example of an operation of the identification system according to an embodiment.
Figure 13:
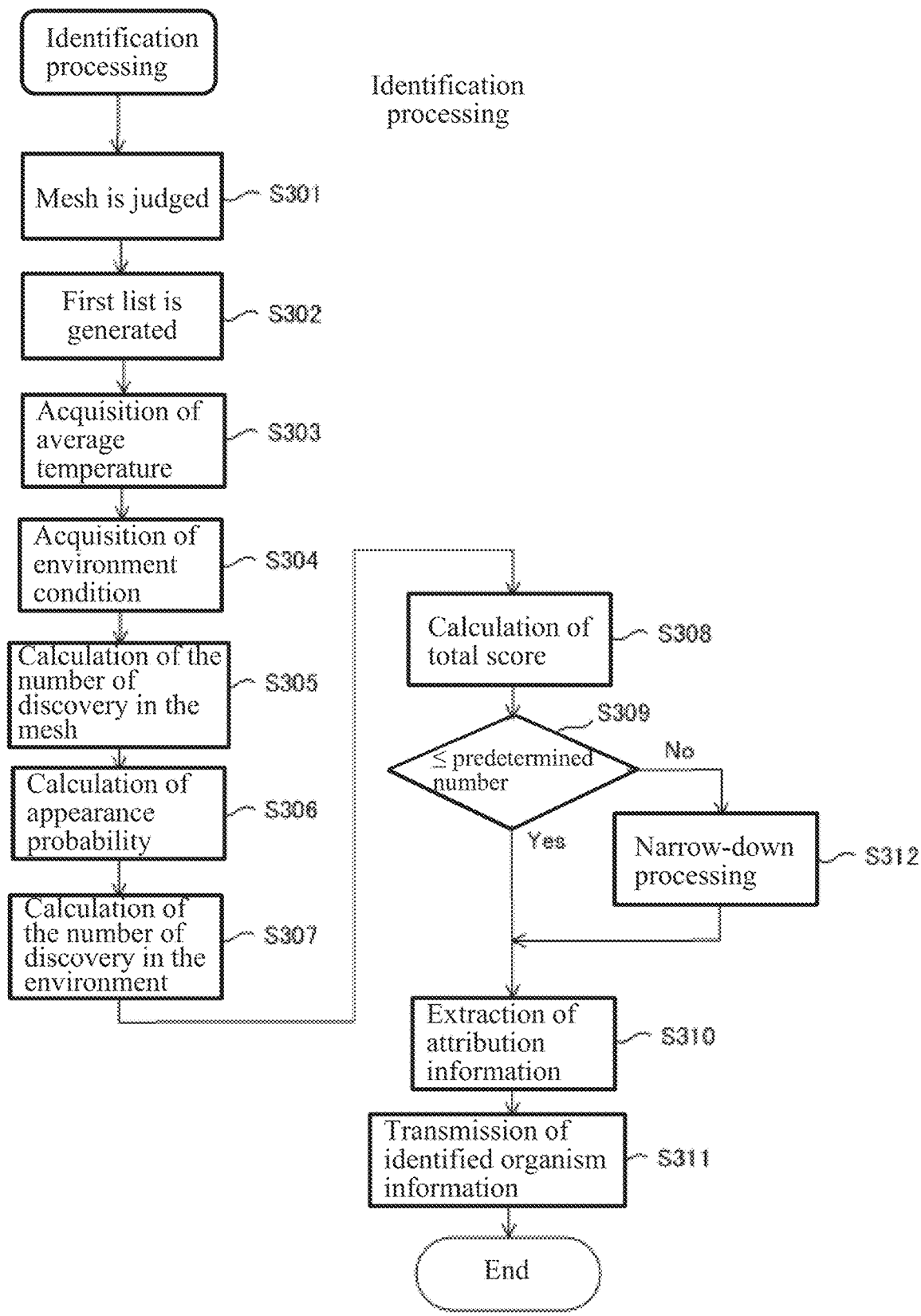
FIG. 13 is a flowchart showing an example of an operation of the identification system according to an embodiment.

FIG. 11 to FIG. 13 are flowcharts showing an example of the operation of the identification system 1 according to the embodiment. Hereinafter, the operation of the identification system 1 according to the embodiments will be described below with reference to the drawings, but the same components as those described with reference to FIG. 1 to FIG. 10 are denoted by the same reference numerals, and the duplicate descriptions will be omitted.

FIG. 11 is a flowchart showing an operation of a user registration of the identification system 1 according to the embodiment.

(Step S101)

First, a user U operates the input device 203 of the user terminal 2 to access the server 3 and downloads (hereinafter referred to as DL) identification application software (hereinafter also referred to as "identification application") of this embodiment. When the control unit 312 of the server 3 receives a DL request of an identification application from the user terminal 2, it sends the data of the identification application stored in the storage device 302 via the communication unit 301 to the user terminal 2 that requested it. In the user terminal 2, the data of the identification application transmitted via the communication unit 301 is received by the communication unit 201 and stored in the storage device 202.

(Step S102)

When the DL of the identification application is completed, the user U operates the input device 203 of the user terminal 2 to install the downloaded identification application.

(Step S103)

Next, the user U operates the input device 203 of the user terminal 2 to input the attribution information (for example, nickname (login ID), a contact (e-mail address or telephone number), and a password, etc.) The input attribution information is transmitted to the server 3 via the communication unit 201 of the user terminal 2. In the server 3, a user ID is given by the control unit 312, and the attribution information is stored in the user database DB1 of the storage device 302 in association with the user ID given by the DB update unit 310.

Note that in the above-described user registration, it can be configured such that a provisional registration is performed once with the input attribution information, an invitational URL is sent to the registered email address, and a formal registration is performed by accessing the URL. Further, the user registration may be invitational. By making it invitational, the users who use the application can be controlled, which can eliminate the risk of an increase in the number of users who are only interested in registration or the risk of gathering a large number of users (low-quality users who merely condemn other users) who are not intended by the management side. Therefore, it is possible to prevent a situation in which the impression of the service becomes poor at the introductory stage and the targeted users flow in but do not stay. The user registration may be performed by using other SNSs (Facebook (registered trademark) or Twitter (registered trademark), etc.) through API cooperation.

FIG. 12 is a flowchart showing the operation of the identification system 1 according to the embodiment.

(Step S201)

First, a user U operates the input device 203 of the user terminal 2 to activate the identification application. Next, the user U operates the input device 203 to input the login information (login ID and password). The input login information is transmitted from the user terminal 2 to the server 3 via the communication unit 201.

(Step S202)

The control unit 312 of the server 3 judges whether or not the login information transmitted from the user terminal 2 matches in information stored in user database DB stored in the storage device 302. When the login information does not match (NO in S201), the control unit 312 returns to the operation of S201. Note that when returning to the operation of S201, the login error may be displayed on the display device 204 of the user terminal 2. Also, when the login information matches (YES in S202), the control unit 312 permits the login.

(Step S203)

When logged in, the user U operates the input device 203 of the user terminal 2 to capture an image of an organism discovered using the imaging device 205.

(Step S204)

Next, when the user U operates the input device 203 of the user terminal 2 to instruct the transmission of the image data of the discovered organism, the control unit 208 associates the location information output from the GPS receiver 206 and the current time output from the clock 207 with the image data. The communication unit 201 transmits the imaged data, the location information, and the current time data to the server 3. Note that the image data, the location information, and the current time data constitute the feature information.

(Step S205)

The identification unit 303 of the server 3 performs the identification processing of the organism based on the image data, the location information, and the current time, which are feature information received via the communication unit 301. The identification processing of the organism will be described in detail later.

(Step S206)

The DB update unit 310 of the server 3 updates the information of the database stored in the storage device 302 based on the identification result of the identification by the identification unit 303. Specifically, the DB update unit 310 updates the information of the post information table, the environmental condition count table, etc., of the appearance information database DB5 based on the species of the organisms identified by the identification unit 303, the image data, the location information, the current time, etc. Further, the DB update unit 310 accesses a database that is not illustrated (for example, a pre-existing scientific literature database) via the network 4 and updates each database stored in the storage device 302 based on the collected information.

(Step S207)

The appearance probability calculation unit 306 of the server 3 calculates the appearance probability (rareness) of the organism identified by the identification unit 303 based on the biodistribution information table and the machine learning parameter table stored in the appearance information database DB5 of the storage device 302. The appearance probability calculation unit 306 stores the appearance probability in the post information table of the appearance information database DB5 in association with the organism identified by the identification unit 303. Further, the calculated appearance probability (rareness) can be confirmed at the user terminal 2.

(Step S208)

The presentation unit 308 refers to the database stored in the storage device 302 based on the presentation instruction of the surrounding event information transmitted the from the user terminal 2 and presents at least one or more of an organism inhabiting in the surrounding area, an organism living in a different time period and/or a different season, and an event based on the location information transmitted from the user terminal 2. The information presented by the presentation unit 308 is transmitted to the user terminal 2 via the communication unit 301 to be displayed on the display device 204 of the user terminal 2.

(Step S209)

The judgment unit 309 refers to the database stored in the storage device 302 to determine whether or not the species to be identified by the identification unit 303 is a predetermined species, such as, e.g., a non-native species and an endangered species. When the judgment result by the judgment unit 309 is a predetermined species, the information is transmitted to a predetermined user terminal 2 that has been registered in advance (for example, a terminal of, e.g., a specialized research institute) via the communication unit 301.

(Step S210)

The point awarding unit 307 awards points to a user U in response to the appearance probability of the registered organism and/or the degree of correspondence to other users U (for example, the number of answers to a question by other users U).

(Step S211)

The search unit 311 refers to the database stored in the storage device 302 to search for an organism that matches the search conditions based on the information such as a keyword input by a user U operating the input device 203 of the user terminal 2. The data of the organism searched by the search unit 311 is transmitted to the user terminal 2 via the communication unit 301 to be displayed on the display device 204.

Note that in the operation described with reference to FIG. 12, the operation starts from the login, but when already logged in, the operation may start from S203.

FIG. 13 is a flowchart illustrating the operation of the identification processing of the server 3 (identifying device) in Step S205 of FIG. 12.

(Step S301)

First, the identification unit 303 of the server 3 judges which mesh the user terminal 2 belongs to based on the location information transmitted from the user terminal 2.

(Step S302)

Next, the identification unit 303 refers to the post information table and the biodistribution information table of the appearance information database DB5 to generate a first list of species that may appear in the mesh judged in Step S301 (hereinafter referred to as "applicable mesh").

(Step S303)

Next, the identification unit 303 refers to the weather information table of the environmental condition database DB3 to obtain the average temperature of the current month of the applicable mesh based on the time information transmitted from the user terminal 2.

(Step S304)

Next, the identification unit 303 refers to the environmental condition table of the environmental condition database DB3 to obtain the environmental condition of the applicable mesh.

(Step S305)

Next, the identification unit 303 refers to the post information table and the biodistribution information table of the appearance information database DB5 to calculate the number of past discoveries in the applicable mesh for each species.

(Step S306)

Next, the identification unit 303 calculates the appearance probability in the applicable mesh based on the average temperature obtained in Step S303 and the parameters obtained by referring to the machine learning parameter table of the appearance information database DB5.

(Step S307)

Next, the identification unit 303 refers to the environmental condition count table of the appearance information database DB5 to calculate the number of past discoveries in the environmental condition obtained in Step S304 for each species.

(Step S308)

Next, the identification unit 303 calculates the total appearance probability (total score) for each species based on the values calculated in Steps S305 to S307. Note that the calculation of the total score may be processed by using the values calculated in Steps S305 to S307 with the same weighting or by changing the weighting of the values calculated in Steps S305 to S307.

(Step S309)

Next, the identification unit 303 judges whether or not the number of species in which the total score is a predetermined threshold value (for example, 80% or more) is equal to or less than a predetermined number (for example, five).

(Step S310)

When the number of species is judged by the identification unit 303 to be equal to or less than a predetermined number in Step S309, the information extraction unit 304 extracts the attribution information (image data, description, etc.) of the species in which the total score (appearance probability) exceeds a predetermined threshold from the storage device 302.

(Step S311)

The identification unit 303 instructs to transmit the attribution information extracted by the information extraction unit 304 in Step S310 to the user terminal 2 via the communication unit 301, along with the identified species of the organism. These data are transmitted to the user terminal 2 via the communication unit 301 and displayed on the display device 204 of the user terminal 2. The user U selects the applicable organisms to perform the registration based on the image and/or the description displayed on the display device 204.

(Step S312)

The identification unit 303 performs narrow-down processing when the number of species in Step S309 exceeds a predetermined number. After completion of the narrow-down processing, the identification unit 303 performs the processing of the above-described Steps S310 and S311.

For the narrow-down processing of Step S312, various methods can be considered. Hereinafter, the embodiment of the narrow-down processing in Step S312 will be described. In the following description, the embodiment of each narrow-down processing will be explained individually, but the embodiment of each narrow-down processing may be combined.

First Embodiment

In the first embodiment, the identification unit 303 of the server 3 further narrows down the species based on the image data and/or the attribution information of the image data (for example, the color (RGB data of each pixel) information or the texture (texture) data extracted from the image data) transmitted from the user terminal 2.

Second Embodiment

In the second embodiment, the question extraction unit 305 extracts questions for narrowing down the species and transmits the extracted questions (for example, whether or not there are wings, how many legs does it has, what colors, etc.) to the user terminal 2 via the communication unit 301. The user U operates the input device 203 of the user terminal 2 to enter answers to the questions. The input response is transmitted to the server 3 via the communication unit 201, and the identification unit 303 performs the narrowing-down of the species based on the response transmitted from the user terminal 2.

Third Embodiment

In the third embodiment, the identification unit 303 performs the narrowing-down of the species based on a keyword (for example, wings, six legs, red, etc.) representing the features of the organism input by the user U operating the input device 203 of the user terminal 2. In this case, it may be configured such that the keyword includes the information when transmitting the location information and the time information from the user terminal 2 (an embodiment in which the user U is made to input a keyword in advance) or such that when the predetermined number exceeds in Step S309, the user U is made to input a keyword representing the feature of the organism by operating the input device 203 of the user terminal 2.

Fourth Embodiment

In the fourth embodiment, the information extraction unit 304 extracts the information for making the user U narrow down the species. The identification unit 303 instructs to transmit the information extracted by the information extraction unit 304 to the user terminal 2 via the communication unit 301 along with the species of the organism, and these data are transmitted to the user terminal 2 via the communication unit 301 and displayed on the display device 204 of the user terminal 2. The user U narrows down the species of the organism based on the image and/or the description displayed on the display device 204.

Note that in the example shown in FIG. 13, it is judged whether or not the number of the species is equal to or less than a predetermined number in Step S309, and when the number exceeds the predetermined number, the narrow-down processing is performed. However, it may be configured such that only the top five of the total scores calculated in Step S308 is presented to the user U and whether or not the number is equal to or less than the predetermined number is not judged. It should be noted that the top five is merely an example, and other numerical values, for example, the top three or the top seven, may be used.

Further, in the example shown in FIG. 13, the narrow-down processing of Step S312 is performed only once. However, it may be configured such that after the narrow-down processing of Step S312, the process returns to Step S309 to determine whether or not the number is equal to or less than a predetermined number, and when the number is equal to or less than the predetermined number, Step S310 and the subsequent processing is performed, and when the number is not equal to or less than the predetermined number, the narrow-down processing of Step S312 is performed again. Further, the narrow-down processing of Step S310 and Step S312 may be repeatedly performed until the number becomes equal to or less than the predetermined number. In this case, by performing the narrowing-down in different manners for each narrow-down processing, such as performing the narrowing-down according to the first embodiment in the first narrow-down processing, and performing the narrowing-down according to the second embodiment in the second narrow-down processing, the species of the organism can be efficiently narrowed down.

As described above, the server 3 according to this embodiment is provided with a communication unit 301 for receiving feature information including at least the location, the date and time, the image data, the attribution information of the image data, and a keyword representing the feature of the organism transmitted from the user terminal 2, and an identification unit 303 configured to identify the species of the organism based on the feature information received by the communication unit 301 by referring to the database in which species of organisms are stored in the storage device 302 in association with the feature information. Therefore, unlike a large-scale method configured to obtain spectral data and the like, individual users, etc., can enjoy by easily identifying species of organisms including animals and insects. Further, in the case of using any one or more of the location data, the time data, and the keyword to identify the species of an organism, the communication traffic volume and the calculation amount can be reduced since the data volume required for the identification is small. Further, it is possible to easily identify species of organisms.

Also, in cases where there exists a plurality of species to be identified, the identification unit 303 of the server 3 further narrows down the species based on information different from the information used for the identification among the feature information. Therefore, the number of species to be presented to the user U does not become too large, so the user U is not stressed. Further, in cases where there exists a plurality of species to be identified, it is configured to further narrow down the species, so the communication traffic volume and the calculation amount can be further reduced.

Further, the identification unit 303 of the server 3 further narrows down the species based on the image data and/or the attribution information of the image data transmitted from the user terminal 2, so the identification accuracy can be improved. Further, in the case of using the attribution information of the image data in addition to the image data, it is expected that the identification accuracy can be further improved. Further, since the image data and/or the attribution information of the image data is used at the time of performing the narrowing-down, there is no need to transmit the image data and/or the attribution information of the image data with high data volume first.

Further, in cases where there exists a plurality of species to be identified, since the server 3 is provided with an information extraction unit 304 for extracting information for making the user U narrow down the species and a communication unit 301 for transmitting the information extracted by the information extraction unit 304 to the user terminal are provided, the user U can narrow down the species based on the information transmitted from the server 3.

Further, in cases where there exists a plurality of species to be identified, since the server 3 is provided with the ability to ask other users U about the species, the user U can ask other users U about the species to exchange between users U. Furthermore, the species identified by the identification unit 303 can be confirmed by other users U.

Further, in cases where there exists a plurality of species to be identified, since the server 3 is provided with a question extraction unit 305 for extracting questions to narrow down the species and a communication unit 301 for transmitting questions extracted by the question extraction unit 305 to the user terminal 2, the species can be narrowed down according to responses from a user U and an improvement in the identification accuracy can be expected. Further, since image data having a large amount of information is not transmitted, the data volume is small, and therefore the communication traffic volume and the calculation amount can be reduced.

Further, in cases where there exists a plurality of species to be identified, the identification unit 303 of this embodiment further narrows down the species based on a keyword included in the above-described feature information. Therefore, highly accurate identification can be performed without performing communication with the user terminal 2 again. Further, in cases where the species of the organisms is identified using the location and/or the time information at the time of the identification, the communication traffic volume and the calculation amount can be reduced since image data having a large amount of information is not transmitted and the data volume is small.

The server 3 is provided with a point awarding unit 307 for awarding a point to a user U according to the appearance probability of the organism and/or the degree of correspondence with other users U. Therefore, the registration of the organism to the databases is facilitated. As a result, the identification accuracy of the organism is improved. Further, since points are awarded for the degree of correspondence to other users U, for example, answering questions from other users U or posting useful information, the exchange between users U is promoted.

Further, the server 3 is equipped with an appearance probability calculation unit 306 for calculating the appearance probability (rareness) of an organism. For this reason, it can be expected that the users U may identify organisms one after another in an attempt to find an organism having a lower appearance probability (higher rareness), and the registration of organisms to the database is promoted. As a result, the identification accuracy of organisms is further improved. Further, by posting eyewitness information or the like, the exchange between users U can be further promoted.

Furthermore, the server 3 is provided with a presentation unit 308 for presenting at least one or more of an organism inhabiting in the surrounding, an organism inhabiting in a different time period and/or a different season, and an event, based on the feature information transmitted from the user terminal 2. For this reason, it can be expected that users U will go out to the presented region or location, which can be used for regional revitalization, town revitalization, and the like.

Also, the server 3 is provided with a judgment unit 309 for judging whether or not the species to be identified by the identification unit 303 is a predetermined species and a communication unit 301 for transmitting the information (information indicating the predetermined species) to a predetermined user terminal 2 when the judgment result in the judgment unit 309 is a predetermined species. Therefore, for example, when a predetermined species, such as, e.g., a non-native species and an endangered species, is found, it is automatically notified a specialized research institute or the like immediately. Further, since such information is automatically collected, it is highly convenient.

Further, since the database structure according to this embodiment includes feature information including at least one or more pieces of information including a location, date and time, image data, attribution information of the image data, and a keyword representing the feature of the organism, and species information of organisms associated with the feature information. Therefore, it is possible to identify the species of the organism with only one of the information among the location, the date and time, the image data, the attribution information of the image data, and the keyword representing the feature of the organism.

Other Embodiments

The present invention is not limited to the structures and forms of each of the above-described embodiments and can be appropriately modified and embodied without deviating from the gist the present invention. For example, the configurations of the identification system of the first embodiment may be combined.

For example, in the above-described embodiment, the species of an organism is identified based on the location information and the time information transmitted from the user terminal 2, but the species of the organism may be identified using only the location information or the time information. Further, in the above-described embodiment, the species of the organism is identified based on the location information and the time information and the narrow-down processing is performed in cases where the number of candidate species is equal to or greater than a predetermined number. But, it may be configured such that only red organisms are extracted based on the image data and/or the attribution information of the image data transmitted from the user terminal 2 (for example, color (RGB data of each pixel) information or texture (texture) data extracted from the image data), and the narrow-down processing of the extracted species of organisms is performed based on the location information and/or the time information transmitted from the user terminal 2 in cases where the number of the candidate species is equal to or greater than a predetermined number.

Further, it may be configured such that in cases where the species of the organism is identified based on the response to a question transmitted from the user terminal 2 and the number of the candidate species is equal to or greater than a predetermined number, the narrow-down processing is performed based on the location information and/or the time information transmitted from the user terminal 2.

Further, it may be configured such that the species of the organism is identified based on a keyword (for example, wings, six legs, red, etc.) representing the feature of the organism transmitted from the user terminal 2, and in cases where the number of the candidate species is equal to or greater than a predetermined number, the narrow-down processing is performed based on the location information and/or the time information transmitted from the user terminal 2.

INDUSTRIAL APPLICABILITY

As described above, the present invention can provide an identifying device, an identification method, an identification system, and a database structure capable of identifying species of organisms including animals, insects, and plants.

DESCRIPTION OF SYMBOLS

1: Identification system
2: User terminal
201: Communication unit (transmission unit and reception unit)
202: Storage device
203: Input device
204: Display device
205: Imaging device
206: GPS receiver
207: Clock
208: Control unit
3: Server (identifying device)
301: Communication unit (transmission unit and reception unit)
302: Storage device
303: Identification unit
304: Information extraction unit
305: Question extraction unit
306: Appearance probability calculation unit
307: Point awarding unit
308: Presentation unit
309: Judgment unit
310: DB update unit
311: Search unit
312: Control unit
4: Network

The invention claimed is:

1. An identifying device for identifying an organism, comprising:
a reception unit configured to receive feature information including at least one of a location, date and time, image data, and attribution information of the image data, and a keyword representing a feature of the organism, the feature information being transmitted from a user terminal;
an identification unit configured to identify a species of the organism and calculate an appearance probability of the organism for each species based on the feature information received by the reception unit by referring to a database in which species of organisms are stored in association with feature information;
an information extraction unit configured to extract attribution information of species in which the appearance probability exceeds a predetermined threshold; and
a transmission unit configured to transmit the attribution information extracted by the information extraction unit to the user terminal together with the species identified by the identification unit,
wherein the identification unit is further configured to:
determine whether or not a number of the species in which the appearance probability is equal to or more than a predetermined threshold is equal to or less than a predetermined number;
instruct the transmission unit to transmit the attribution information extracted by the information extraction unit to the user terminal together with the identified species of the organism when the number of the species in which the appearance probability is equal to or more than the predetermined threshold is equal to or less than the predetermined number; and
further narrow down the species, based on information different from the information used for the identification among the feature information when the number of the species in which the appearance probability is equal to or more than the predetermined threshold exceeds the predetermined number.

2. The identifying device as recited in claim 1, further comprising:
a point awarding unit configured to award a point to a user depending on a degree of correspondence to other users.

3. The identifying device as recited in claim 1, further comprising:
a first presentation unit configured to present at least one of an organism inhabiting in a surrounding region and an organism inhabiting in a different time period and/or a different season, based on the feature information transmitted from the user terminal.

4. The identifying device as recited in claim 1, further comprising:
a presentation unit configured to present a nearby event, based on the feature information transmitted from the user terminal.

5. The identifying device as recited in claim 1,
wherein in cases where there exists a plurality of identified species, the identification unit further narrows down the species, based on the keyword included in the feature information.

6. The identifying device as recited in claim 1,
wherein the identification unit further narrows down the species, based on the image data and/or the attribution information of the image data.

7. The identifying device as recited in claim 1, further comprising:
an information extraction unit configured to extract information to make a user narrow down the species in cases where there exists a plurality of identified species; and a first transmission unit configured to transmit the information extracted by the information extraction unit to the user terminal.

8. The identifying device as recited in claim 1, wherein in cases where there exists a plurality of identified species, the identifying device has a function to ask other users a question about the plurality of species.

9. The identifying device as recited in claim 1, further comprising:
   a question extraction unit configured to extract a question to narrow down the species in cases where there exists a plurality of species to be identified, and
   a second transmission unit configured to transmit the question extracted by the question extraction unit to the user terminal.

10. The identifying device as recited in claim 1, further comprising:
    a judgment unit configured to judge whether or not the species identified by the identification unit is a predetermined species; and
    a second transmission unit configured to transmit information in which a judgement result by the judgement unit is the predetermined species to a predetermined user terminal in cases where the judgment result by the judgment unit is the predetermined species.

11. An identification method for identifying an organism, comprising the steps of:
    receiving feature information by a reception unit, wherein the feature information includes at least one of a location, date and time, image data, and attribution information of the image data, and a keyword representing a feature of the organism, the feature information being transmitted from a user terminal; and
    identifying a species of the organism and calculating an appearance probability of the organism for each species by an identification unit, based on the feature information received by the reception unit by referring to a database in which species of organisms are stored in association with the feature information;
    extracting attribution information of a species in which the appearance probability exceeds a predetermined threshold by an information extraction unit; and
    transmitting the attribution information extracted by the information extraction unit to the user terminal together with the species identified by the identification unit by a transmission unit,
    wherein the identification unit is further configured to:
    determine whether or not a number of the species in which the appearance probability is equal to or more than a predetermined threshold is equal to or less than a predetermined number;
    instruct the transmission unit to transmit the attribution information extracted by the information extraction unit to the user terminal together with the identified species of the organism when the number of the species in which the appearance probability is equal to or more than the predetermined threshold is equal to or less than the predetermined number; and
    further narrow down the species, based on information different from information used for the identification among the feature information when the number of the species in which the appearance probability is equal to or more than the predetermined threshold exceeds the predetermined number.

12. A non-transitory storage device storing an identifying program for identifying an organism, the program is configured to make a computer function as:
    a reception unit configured to receive feature information including at least one of a location, date and time, image data, and attribution information of the image data, and a keyword representing a feature of the organism, the feature information being transmitted from a user terminal;
    an identification unit configured to identify a species of the organism and calculate an appearance probability of the organism for each species, based on the feature information received by the reception unit by referring to a database in which species of organisms are stored in association with the feature information;
    an information extraction unit configured to extract attribution information of species in which the appearance probability exceeds a predetermined threshold; and
    a transmission unit configured to transmit the attribution information extracted by the information extraction unit to the user terminal together with the species identified by the identification unit,
    wherein the identification unit is further configured to:
    determine whether or not a number of the species in which the appearance probability is equal to or more than a predetermined threshold is equal to or less than the predetermined number;
    instruct the transmission unit to transmit the attribution information extracted by the information extraction unit to the user terminal together with the identified species of the organism when the number of the species in which the appearance probability is equal to or more than the predetermined threshold is equal to or less that the predetermined number; and
    further narrow down the species, based on information different from the information used for the identification among the feature information when the number of the species in which the appearance probability is equal to or more than the predetermined threshold exceeds the predetermined number.

13. An identification system for identifying an organism, comprising:
    a user terminal configured to transmit feature information including at least one of a location, date and time, image data, and attribution information of the image data, and a keyword representing a feature of the organism; and
    an identifying device,
    wherein the identifying device includes:
    a reception unit configured to receive the feature information transmitted from the user terminal;
    an identification unit configured to identify a species of the organism and calculate an appearance probability of the organism for each species, based on the feature information received by the reception unit by referring to a database in which species of organisms are stored in association with the feature information;
    an information extraction unit configured to extract attribution information of a species in which the appearance probability exceeds a predetermined threshold; and
    a transmission unit configured to transmit the attribution information extracted by the information extraction unit to the user terminal together with the species identified by the identification unit,
    wherein the identification unit is further configured to:
    determine whether or not a number of the species in which the appearance probability is equal to or more than a predetermined threshold is equal of or less than a predetermined number;

instruct the transmission unit to transmit the attribution information extracted by the information extraction unit to the user terminal together with the identified species of the organism when the number of the species in which the appearance probability is equal to or more than the predetermined threshold is equal to or less than the predetermined number; and further narrow down the species, based on information different from the information used for the identification among the feature information when the number of the species in which the appearance probability is equal to or more than the predetermined threshold exceeds the predetermined number.

\* \* \* \* \*